United States Patent [19]

Allen

[11] Patent Number: 4,844,497
[45] Date of Patent: Jul. 4, 1989

[54] SELF-COUPLING TRAILER HITCH

[76] Inventor: Bill Allen, Rt. 2, Box 2690, Talihina, Okla. 74571

[21] Appl. No.: 202,777

[22] Filed: Jun. 6, 1988

[51] Int. Cl.⁴ .............................................. B62D 7/00
[52] U.S. Cl. ..................................... 280/477; 280/508
[58] Field of Search ................................ 280/477, 508

[56] References Cited

U.S. PATENT DOCUMENTS

| 3,891,237 | 6/1975 | Allen | 280/477 |
| 3,912,302 | 10/1975 | Patterson | 280/477 |
| 4,560,184 | 12/1985 | Williams, Jr. | 280/477 |

FOREIGN PATENT DOCUMENTS 737547  7/1943  Fed. Rep. of Germany ...... 280/477

Primary Examiner—Kenneth R. Rice
Attorney, Agent, or Firm—Robert K. Rhea

[57] ABSTRACT

An elongated member, adapted to be connected with a towed vehicle, is provided with an axial socket coaxial with a bell-shaped flange for guiding a shank, connected at one end by a ball joint to a traction vehicle, into the socket whereby a spring urged pawl engages a keeper notch formed in the shank for automatically coupling the traction vehicle to the towed vehicle.

2 Claims, 1 Drawing Sheet

U.S. Patent   Jul. 4, 1989   4,844,497
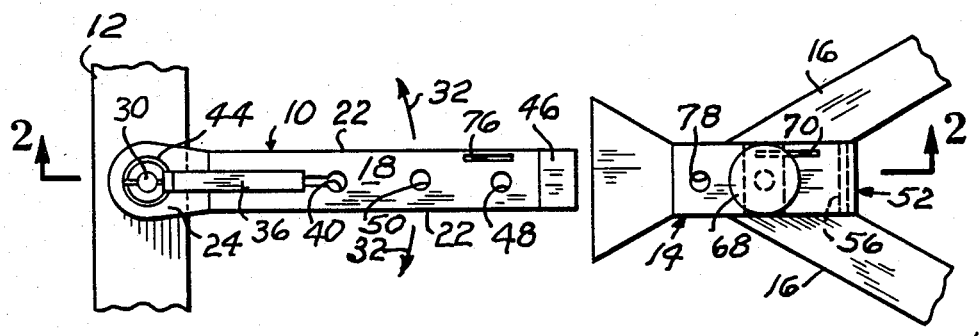
FIG. 1
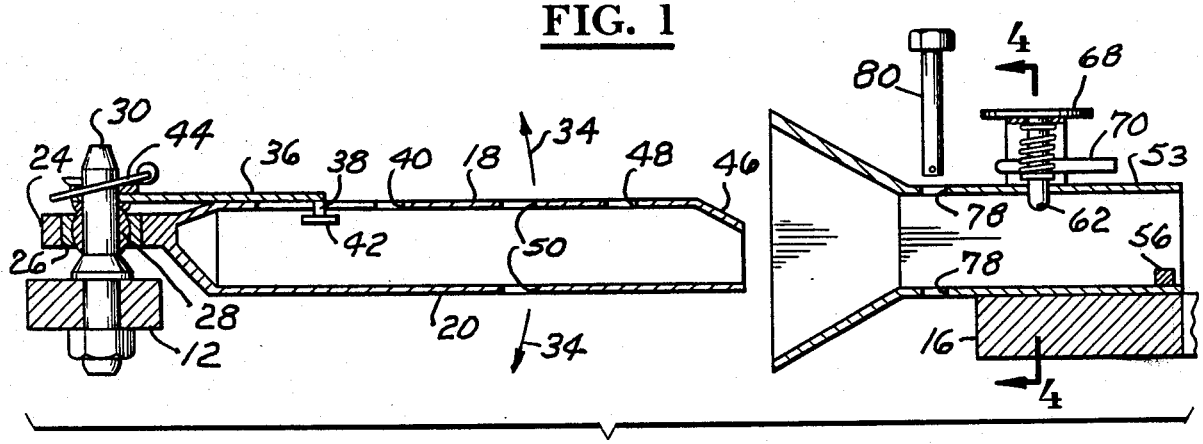
FIG. 2
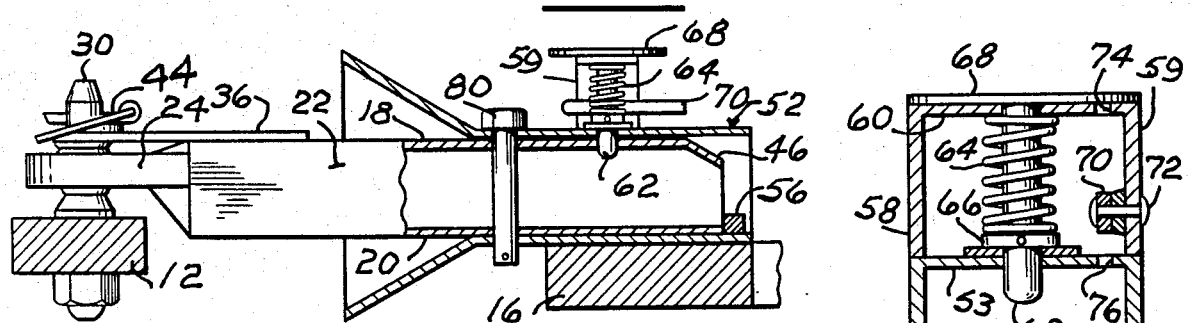
FIG. 3
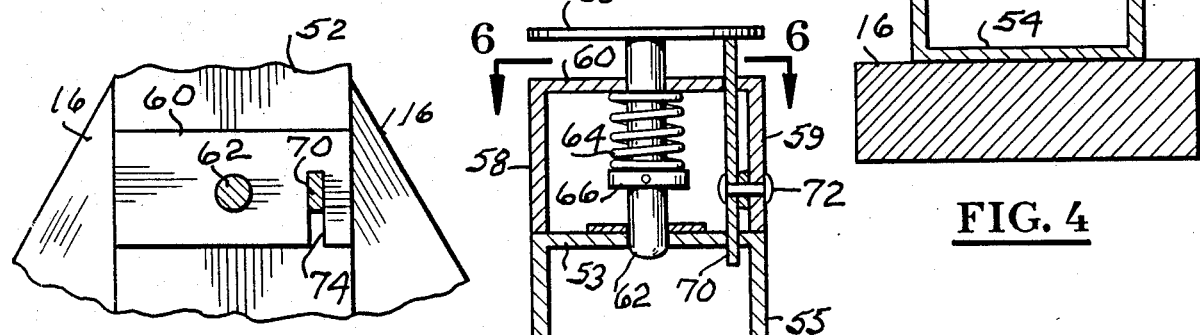
FIG. 6
FIG. 4
FIG. 5

– 4,844,497 –

SELF-COUPLING TRAILER HITCH

BACKGROUND OF THE INVENTION

1. Field of The Invention.

The present invention relates to trailer hitches and more particularly to a trailer hitch automatically coupling a traction vehicle to a towed vehicle.

One of the problems associated with effecting the juncture or coupling of a trailer hitch joining a traction vehicle to a towed vehicle, particularly when only the driver is present, is proper alignment of the two principal components of the trailer hitch connected respectively with the traction vehicle and the towed vehicle. Where the vehicle or trailer to be towed is a two-wheel trailer its tongue and trailer hitch components are normally resting on the surface of the earth and must be lifted for connection with the ball portion of the hitch connected with the traction vehicle. Where the towed vehicle or trailer is of the four-wheel type a similar problem exists, such as obtaining a proper separation or spacing between a traction vehicle and the towed vehicle to be connected by a trailer hitch so that a connection may be effected by the driver after stopping the traction vehicle.

2. Description of the Prior Art.

The most pertinent prior patent is believed to be my U.S. Pat. No. 3,891,237 which discloses a self-coupling hitch formed by a hitch ball connected shank having a recess in its rearwardly extending end portion which, upon entering a ball-shaped socket, locks with a spring urged pawl. While this patent operates as intended it has been found that additional rigidity is desired in the hitch tongue portion and more flexibility at the position of automatic coupling which the present invention accomplishes and additionally provides a means for semiautomatic disconnection of the hitch components when desired.

SUMMARY OF THE INVENTION

An elongated towing vehicle hitch tongue, having one tapered end surface and a keeper notch adjacent its tapered end portion, is pivotally connected, at its other end, to a traction vehicle by a ball joint and keeper normally maintaining the longitudinal axis of the tongue horizontal. An elongated socket member is rigidly connected at one end portion to the forward end portion of a towed vehicle. A funnel-like forward flange portion on the socket member coaxial with its axis guides the tongue into the socket member. The socket member is provided with a spring urged latch pin entering a vertical opening in the socket member for joining the tongue to the socket member. The rearward end portion of the socket member contains a stop abutting the rearward end of the tongue for aligning the tongue and socket member and receiving the locking pin.

The principal object of this invention is to provide a trailer hitch which automatically couples hitch components respectively connected to traction and towed vehicles so that such coupling can be easily and quickly made by a single driver manipulating the traction vehicle in a backing action toward the towed vehicle and semiautomatically releases the hitch when desired.

BRIEF DESCRIPTION OF THE DRAWINGS

FIG. 1 is a top view of the trailer hitch components in separated relation respectively connected to fragmentary portions of a traction vehicle and a towed vehicle;

FIG. 2 is a vertical cross sectional view taken substantially along the line 2—2 of FIG. 1;

FIG. 3 is a view similar to FIG. 2 illustrating the trailer hitch components in coupled relation;

FIG. 4 is a vertical cross sectional view, to a larger scale, taken substantially along the line 4—4 of FIG. 2;

FIG. 5 is a fragmentary cross sectional view similar to FIG. 4 illustrating the latch pin lever in elevated position; and, FIG. 6 is a top view, partially in section taken substantially along the line 6—6 of FIG. 5.

DESCRIPTION OF THE PREFERRED EMBODIMENTS

Like characters of reference designate like parts in those figures of the drawings in which they occur.

In the drawings:

The reference numeral 10 indicates an elongated tongue projecting rearwardly from a towing vehicle bumper or frame 12 for connection with an elongated socket 14 longitudinally secured to the forward end portion of frame members 16 of a towing vehicle. The trailer tongue 10 is preferably square tubular in transverse section (FIGS. 4 and 5) defined by horizontal top and bottom walls 18 and 20 interconnected by side walls 22 for the rigidity of a box-channel shape. The forward end portion of the tongue 10 is convergingly tapered and provided with a horizontal forwardly projecting head portion 24 vertically apertured and provided with a bearing 26 for nesting a substantially spherical diametrically apertured ball 28 surrounding a vertical hitch pin 30 projecting through the vehicle frame 12 in upstanding relation thereabove. This permits the tongue to be pivoted laterally in the direction of the arrows 32 as well as vertical in the direction of the arrows 34 for the purposes presently apparent.

The tongue is normally maintained substantially horizontal by a keeper 36 surrounding the hitch pin 30 at one end portion and extending rearwardly in horizontal contact with the forward end portion of the tongue 10. The rearward end portion of the keeper 36 is provided with a depending pin 38 projecting through an elongated tongue slot 40 and secured therein by a pin head portion 42. The keeper is secured to the hitch pin 30 by a click pin 44.

The rearward end portion of the tongue top wall 18 is tapered or turned downwardly, as at 46, for the purposes presently explained. Additionally, the tongue top wall 18 is provided with a vertical aperture 48 spaced forwardly of the tapered surface 46 and a through line drilled lock pin aperture 50 at a predetermined distance forwardly of the aperture 48.

The socket forming member 14 similarly comprises an open end box tube member 52 having its respective top and bottom walls 53 and 54 flared upwardly and downwardly on a selected angle and its side walls 55 flared laterally on an identical angle to define a flared opening of substantially greater dimension at its forward limit than the transverse dimension of the trailer tongue for guiding the later into the socket member when moved longitudinally rearwardly toward the socket member. The socket member is provided with a transverse stop 56 for engaging the rearward end of the tongue bottom wall 20. The top wall 53 of the socket member is transversely provided with an inverted substantially U-shaped upstanding bracket connected by its legs 58 and 59 with the socket top wall 53 at a selected location intermediate its ends. The transverse top or bight portion 60 of the U-shaped bracket is centrally apertured in line with a similar aperture in the socket top wall 53 for slidably receiving vertically a latch pin 62 which enters the tongue top wall aperture 48 when the tongue is moved into the socket as is presently explained.

The latch pin 62 is normally urged downwardly by a surrounding spring 64 interposed between the bracket bight portion 60 and a stop ring 66 secured to the depending end portion of the latch pin 62. The top end of the latch pin 62 has a horizontal plate 68 secured thereto for lifting the latch pin to its uppermost limit (FIG. 5) to release the tongue 10. This latch pin lifted position is maintained by a latch pin lever 70 pivotally joined, at one end portion, to the bracket leg 59 by a pin 72. The length of the lever 70 is greater than the bracket legs 58 and 59 so that one end portion of the lever, when pivoted to a vertical position, enters a horizontal slot 74 formed in the bracket bight portion 60 so that the upper end of the lever 70, when vertically disposed, supports the plate 68 and latch pin 62. Simultaneously the depending end portion of the latch pin 70 enters a slot 76 longitudinally formed in the tongue top wall 18 laterally of its aperture 48 for the purposes presently explained.

The top wall 53 of the socket tube is further vertically line drilled spaced forwardly of the latch pin 62 and rearwardly of the flared end in cooperative alignment with the line drilled apertures 50, as at 78, for cooperatively receiving a lock pin 80 simultaneously entering the vertical bores 50 an the tongue 10.

OPERATION

In operation, assuming the hitch tongue 10 and socket member 14 have been respectively installed on a towing vehicle and trailer to be towed, as described hereinabove. The tongue is manually adjusted vertically and laterally for estimated substantial alignment with the axis of the socket axis. While the vehicles are spaced some distance apart, the driver backs the towing vehicle toward the vehicle to be towed wherein the rearward end portion of the tongue enters the forward flanged end of the socket member 14 and is guided into alignment with the axis of the socket. The tapered rearward surface 46 of the tongue lifts the latch pin 62 vertically by compressing its spring 64 with such rearward movement of the tongue being arrested by the stop 56 at which point the tongue opening 48, being aligned with the vertical axis of the latch pin 62, the latter is urged into the aperture 48 in an automatic self-locking connection of the trailer components. The driver may then manually insert the lock pin 80 through the aligned apertures 50 and 78 and secure it against removal.

When the trailer has been moved to its destination and is to be disconnected from the towing vehicle the driver removes the lock pin 80, lifts the latch pin plate 68 and pivots the latch pin lever 70 to its vertically disposed position (FIG.. 5). The driver then drives the towing vehicle forwardly so that, as the tongue 10 leaves the socket member 14, the end tongue slot 76 contacts the latch pin lever depending end portion and pivots the top portion of the latch pin lever 70 rearwardly until the lever is substantially horizontally disposed which releases the latch pin to its desired spring urged position ready for a second or subsequent automatic joining of the hitch components.

Obviously the invention is susceptible to changes or alterations without defeating its practicability. Therefore, I do not wish to be confined to the preferred embodiment shown in the drawings and described herein.

I claim:

1. A trailer hitch for automatically coupling a traction vehicle to a towed vehicle, comprising:
    an elongated tongue projecting longitudinally rearward from the rearward end of a traction vehicle and having at least one vertical aperture spaced forwardly from its rearward limit;
    an elongated tubular socket projecting longitudinally forward from the forward end of a vehicle to be towed for telescopically receiving said tongue,
    said tubular socket having the forward end portion of its wall flared outwardly to define an opening having a diameter substantially twice the diameter of the tongue;
    a stop limiting the telescoping movement of the tongue into the socket;
    latch pin means including:
        a latch pin supported by and normally spring biased for projecting into the tubular socket and securing the rearward end portion of the tongue within the tubular socket,
        an inverted U-shaped bracket having the ends of its depending legs secured in transversely spaced relation the top surface of the socket member,
        said bracket having a centrally apertured bight portion slidably receiving one end portion of said latch pin,
        a plate secured to the end of said latch pin projecting through the bight portion,
        a spring stop secured to the depending end portion of said latch pin above the socket member,
        a spring interposed between the bight portion and the spring stop;
        said tongue having an inclined rearward wall surface for lifting the latch pin out of the path of the tongue and having a longitudinally extending slot spaced laterally of the said one tongue aperture,
        said bracket bight portion being provided with a slot extending longitudinally parallel with and spaced above the tongue slot;
    a latch pin lever pivotally connected intermediate its ends with one said bracket leg for releasably supporting said latch pin above the uppermost limit of said tongue when its respective end portions are disposed within the slots, and,
    spring and clip means pivotally connecting the forward end portion of said tongue to the towing vehicle for normally maintaining the longitudinal axis of said tongue horizontal.

2. The trailer hitch according to claim 1 in which the forward top surface of the tongue is provided with a longitudinally extending keeper slot and in which the spring and clip means includes:
    an upstanding hitch pin secured to the towing vehicle;
    bearing and part-spherical ball means pivotally connecting the forward end portion of said tongue to the hitch pin;
    a keeper surrounding the hitch pin and longitudinally overlying the forward end portion of the tongue and having its rearward end portion slidably entering the keeper slot; and,
    a klick pin secured to said hitch pin above and in contact with the keeper.

* * * * *